(12) United States Patent
Abargues López et al.

(10) Patent No.: US 12,551,870 B2
(45) Date of Patent: Feb. 17, 2026

(54) CATALYTIC NICKEL OXIDE SHEET, METHOD FOR OBTAINING IT AND USE THEREOF

(71) Applicants: UNIVERSITAT DE VALÈNCIA, Valencia (ES); UNIVERSITAT JAUME I, Castello de la Plana (ES)

(72) Inventors: Rafael Abargues López, Valencia (ES); Jaume Noguera, Valencia (ES); Juan P. Martinez Pastor, Valencia (ES); Sixto Gimenez Julia, Castello de la Plana (ES); Miguel Garcia Tecedor, Castello de la Plana (ES); Pedro J. Rodriguez-Canto, Paterna (ES)

(73) Assignees: UNIVERSITAT DE VALÈNCIA, Valencia (ES); UNIVERSITAT JAUME I, Castello de la Plana (ES)

( * ) Notice: Subject to any disclaimer, the term of this patent is extended or adjusted under 35 U.S.C. 154(b) by 429 days.

(21) Appl. No.: 17/596,719

(22) PCT Filed: Jun. 16, 2020

(86) PCT No.: PCT/ES2020/070390
§ 371 (c)(1),
(2) Date: Dec. 16, 2021

(87) PCT Pub. No.: WO2020/254705
PCT Pub. Date: Dec. 24, 2020

(65) Prior Publication Data
US 2022/0314205 A1   Oct. 6, 2022

(30) Foreign Application Priority Data

Jun. 19, 2019 (ES) .................. P201930558

(51) Int. Cl.
*B01J 23/755* (2006.01)
*B01J 31/02* (2006.01)
(Continued)

(52) U.S. Cl.
CPC ............. *B01J 23/755* (2013.01); *B01J 31/02* (2013.01); *B01J 35/19* (2024.01); *B01J 35/39* (2024.01);
(Continued)

(58) Field of Classification Search
None
See application file for complete search history.

(56) References Cited

FOREIGN PATENT DOCUMENTS

| CN | 103974769 | 8/2014 |
|---|---|---|
| JP | 2015049973 | 3/2015 |

OTHER PUBLICATIONS

Ehsani, A., et al. "Electrosynthesis of polypyrrole composite film and electrocatalytic oxidation of ethanol." Electrochimica acta 71 (2012): 128-133.

(Continued)

*Primary Examiner* — Yun Qian
(74) *Attorney, Agent, or Firm* — ICE MILLER LLP; Safet Metjahic

(57) ABSTRACT

The present invention relates to an enhanced catalytic nickel oxide sheet having an organic part which includes non-stoichiometric nickel oxides dispersed in an organic matrix, wherein the catalytic sheet is supported on a substrate. The invention also relates to a method for obtaining the catalytic film and to its uses as an electrode in electrocatalysis of water or in photocatalysis.

5 Claims, 3 Drawing Sheets

(51) Int. Cl.
  *B01J 35/00* (2006.01)
  *B01J 35/39* (2024.01)
  *B01J 35/58* (2024.01)
  *B01J 37/02* (2006.01)
  *B01J 37/08* (2006.01)

(52) U.S. Cl.
  CPC .......... *B01J 35/58* (2024.01); *B01J 37/0219* (2013.01); *B01J 37/08* (2013.01)

(56) References Cited

OTHER PUBLICATIONS

Srivastava, Amit Kumar, Subhash Thota, and Jitendra Kumar. "Preparation, microstructure and optical absorption behaviour of NiO thin films." Journal of Nanoscience and Nanotechnology 8.8 (2008): 4111-4115.

Li, Fei, et al. "Electrocatalytic water oxidation by a nickel oxide film derived from a molecular precursor." Chinese Journal of Catalysis 38.11 (2017): 1812-1817.

De, Sudipta, et al. "Ni-based bimetallic heterogeneous catalysts for energy and environmental applications." Energy & environmental science 9.11 (2016): 3314-3347.

McCrory, Charles CL, et al. "Benchmarking heterogeneous electrocatalysts for the oxygen evolution reaction." Journal of the American Chemical Society 135.45 (2013): 16977-16987.

International Search Report issued in PCT/ES2020/070390, mailed Sep. 14, 2020.

CATALYTIC NICKEL OXIDE SHEET, METHOD FOR OBTAINING IT AND USE THEREOF

CROSS-REFERENCE TO RELATED PATENT APPLICATIONS

This is a U.S. National Phase Application under 35 U.S.C. § 371 of International Patent Application No. PCT/ES2020/070390, filed Jun. 16, 2020, and claims priority to Spanish Patent Application No. P201930558, filed Jun. 19, 2019, which is incorporated by reference in its entirety. The International Application was published on Dec. 24, 2020, as International Publication No. WO 2020/254705 A1.

The present invention belongs to the field of catalysts. In particular, the invention relates to an improved catalytic film based on nickel oxide.

The catalytic film of the invention is provided with an inorganic part, including non-stoichiometric nickel oxides dispersed in an organic part supporting the non-stoichiometric nickel oxides, the catalytic film being supported on a substrate.

BACKGROUND OF THE INVENTION

There is currently an increasing need to generate clean energy from renewable energies. The development of clean energy is essential to combat climate change and limit its most devastating effects. One of the sources is $H_2$ generation from water hydrolysis. The use of $H_2$ as a fuel for the generation of electricity in a fuel cell is one of the most promising solutions because it is a clean energy, since its combustion generates $H_2O$ as the result of the reaction.

Water hydrolysis is an endothermic process that requires very high temperatures, around 220° C., for the reaction to occur spontaneously. An alternative is water hydrolysis at room temperature by electrochemical methods. In this process the following reactions occur:

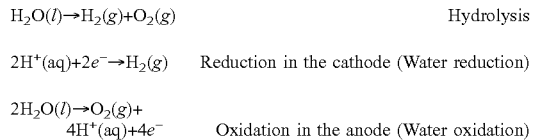

Hydrolysis of water by electrochemical means (electrolysis) is carried out by means of a direct current applied between the two electrodes, anode and cathode. Thus, in the cathode the reduction of water to generate $H_2$ occurs and in the anode the oxidation of water to produce $O_2$ is carried out. However, water electrolysis water requires a large amount of extra energy in the form of an overpotential with respect to that theoretically necessary to carry it out, which is +1.23 V, because as in any chemical reaction, it is necessary to overcome the activation energy of the reaction in order for it to occur. Catalysts are used to reduce the overpotential because they significantly reduce the activation energy.

Among the existing materials for use as selective electrodes for water oxidation, iridium oxide ($IrO_2$) and ruthenium oxide ($RuO_2$) are the electrocatalysts known to date with the best results. These electrocatalysts can also be used for water reduction. However, due to their scarcity, the high cost of Ru and Ir is one of the main factors limiting its implementation on an industrial scale.

Therefore, because both Ir and Ru are scarce and expensive metals, there is a need to develop new catalysts based on metals that are more abundant in the earth's crust and thus more economical. The feasibility of obtaining clean energy in this way depends on, in addition to using low-cost materials, being able to manufacture the catalysts with these materials by means of low-cost techniques and carrying out $H_2$ generation with improved yields.

Although the use of photoelectrochemistry in hydrogen production processes has enormous potential, so far it has not been possible to develop an application capable of competing economically with conventional procedures, such as methane reforming that allows obtaining hydrogen at a lower cost, albeit with an important carbon footprint that must be eliminated.

On the other hand, catalysts based on solid-state metal oxides such as CoPi, Co—Bi, CoOx, MnOx and NiOx are known. However, most of these oxides are deposited by chemical or electrochemical methods, by physical methods such as sputtering, and by photochemical deposition methods.

Patent CN103974769 discloses the obtaining of metal oxides for catalytic purposes. However, the technique employed, known as photochemical metal-organic deposition (PMOD), requires the use of ultraviolet (UV) radiation. In particular, a precursor is deposited which is then irradiated with UV light until all the organic material is decomposed and metals are formed in the metallic state which are then oxidized using high temperatures. This technique requires several steps, in addition to irradiating with UV light and employing high temperatures for the formation of metal oxides and eliminating any organic residues present initially.

In addition, patent JP2015049973 discloses the synthesis of Ni(0) nanoparticles, nickel 0 in the metallic state from Ni(+2). After the reaction, the Ni(0) nanoparticles are deposited on an electrode.

The paper by Ehsani, A. et al. "Electrosynthesis od polypyrrole composite film and electrocatalytic oxidation of ethanol", ELECTROCHEMISTRY ACT, Vol. 71, pages 128-133, describes a catalytic sheet of nickel oxide, comprising non-stoichiometric and crystalline nickel oxide in the oxidation states Ni(II) and Ni(III) ($NiO_2$ and NiOOH), dispersed in a polymeric organic matrix (polypyrrole) supported on a substrate (graphite).

At the technological level, in order to promote alternative technologies based on the use of renewable energies such as photoelectrocatalysis, it is necessary to reduce both the costs of the materials used and the costs of the manufacturing processes of devices for the generation of $H_2$. Moreover, continuous improvement of $H_2$ generation yields is necessary.

Recently, the obtaining of electrodes for $O_2$ generation has been investigated since these electrodes limit the increase in the yield of the water hydrolysis reaction. This is because the water oxidation reaction is more difficult, as there are more species (4 electrons and $4H^+$) than in the water reduction reaction (2 electrons and $2H^+$). This means that, in the anode, the existing overpotentials are very low, while in the cathode there are high overpotentials due to a higher activation energy of the reaction. Thus, there is a large kinetics limitation of the electrochemical reaction for oxygen generation, limiting the effectiveness of water hydrolysis by electrocatalysis.

There is, therefore a need to provide an improved catalyst based on metal oxides abundant in the earth's crust, which can be manufactured by low-cost techniques and is useful for the oxidation of water to $O_2$ with good yields.

As for the photocatalytic properties, there are numerous research works in which mainly broadband semiconductors are used, mainly titanium oxide and zinc oxide.

Therefore, there is also a need to develop new improved catalysts for the decomposition of contaminants, mainly present in water but also in air, with industrially applicable manufacturing procedures.

DESCRIPTION OF THE INVENTION

With the catalytic film of the invention, at least one of the aforementioned drawbacks can be solved, having other advantages that will be described.

In a first aspect, the invention provides a nickel oxide catalytic film, which is characterized in that it comprises non-stoichiometric and crystalline nickel oxide in the oxidation states Ni(II) and Ni(III) dispersed in an organic matrix, the catalytic film being supported on a substrate.

The catalytic film comprises non-stoichiometric nickel oxide including mixtures of Ni(II) and Ni(III).

Advantageously, the existence of Ni(II) and Ni(III) in the catalytic film surprisingly improves the catalytic properties of an electrode containing it relative to an electrode containing Ni(0).

The catalytic film of the invention comprises an organic part as a support matrix of the non-stoichiometric nickel oxides representing at least 10% by weight of the total weight of the catalytic film. The organic part can represent values of the order of 15-30%.

The authors of the present invention have found that the presence of an amount of organic matter provides a porosity to the catalytic film that unexpectedly improves its catalytic properties.

The organic matrix may be formed by at least one organic compound selected from an alkoxide, acetate, amine, and/or a derivative of any one thereof.

Thus, the catalytic film of the invention is a viable alternative for the oxidation of water to $O_2$ with good yields, low cost of the material for obtaining the catalyst and ease of manufacture employing low-cost techniques, as will be described hereinbelow.

It is also a further object of the present invention to provide a catalytic film with improved catalytic properties with reduced thickness.

The catalytic film of the invention may have a thickness of less than 10 μm, preferably a thickness comprised between 20-600 nm, even more preferably a thickness comprised between 50-300 nm.

The catalytic film of the invention can be obtained with good catalytic properties with the presence of an organic part and reduced thickness. In the present invention, the thickness values given above refer to the layer thickness of the catalytic film supported on the substrate, excluding the substrate thickness.

The catalytic film may be formed of one or more layers, the various layers forming the catalytic film that is supported on the substrate. These layers may be the same or different. The same or different in the invention is understood to mean of the same or different composition, the composition being understood to mean the variation in the concentration of Ni(II) and/or Ni(III) oxide and/or the organic material, and even the variation in the percentage of the organic material present in the organic part of the catalytic film.

The catalytic film may further include metal nanoparticles and/or metal oxide nanoparticles. These metal nanoparticles and/or metal oxide nanoparticles are dispersed in the organic part that acts as the support matrix of these nanoparticles.

The nanoparticles are formed from salts and/or oxides of metals other than nickel, such as salts and/or oxides of Ag, Au, Ru, Ir, Pd, Pt, Re, Co, Fe, Os, Rh, Mo, V, these salts and/or oxides being in solution and added during the process of obtaining the catalytic film for the formation of nanocomposites dispersed in the organic matrix together with the oxides of Ni (II) and Ni (III). These nanocomposites may include mixed oxides.

Advantageously, the presence of such metal nanoparticles and/or metal oxides provides a catalytic film with greater versatility of application. Thus, the catalytic film according to the first aspect of the invention also provides a multi-functional catalytic film that allows optimizing its catalytic properties through the incorporation of co-catalysts.

The structure and morphology of the catalytic film of the invention makes it possible to employ a substrate of insulating material, electrically conductive material or electrically semiconductive material, and even an organic material. Likewise, the substrate may be of a flexible, rigid or semi-rigid material. The substrate may also be transparent or opaque.

Among the materials of the substrate can be cited as a non-limiting example of the invention: transparent materials such as ITO and FTO on glass; rigid or semi-rigid materials such as thin sheets of nickel, aluminium, steel or other metallic supports as well as foam or fiber paper of metals such as nickel, and other types of rigid substrates such as flexible vitreous carbon such as ITO, FTO, and metals such as Au, Pt deposited on polyethylene terephthalate (PET), polyethylene naphthalene (PEN), polypropylene (PP), polyethylene (PE), polyimide (Kapton Tape); organic materials such as cellulose.

In one embodiment, the catalytic film of the invention supported on a substrate is an electrode.

In a second aspect, the invention provides a method for obtaining the catalytic film according to the first aspect of the invention.

The method of obtaining the catalytic film defined in the first aspect of the invention is carried out wet on a substrate as follows:

i) preparing a precursor solution of nickel oxide;
ii) depositing the prepared solution on the substrate;
iii) curing the solution deposited on the substrate to obtain the nickel oxide catalytic film;

and is characterized in that it comprises:

in step i)
   a)—selecting an organic counterion nickel salt;
   b)—dissolving the salt in a non-aqueous solvent of glycol ethers, glycol ether acetates and derivatives thereof in the presence of an aminoalcohol chelating agent to obtain a solution of the nickel salt;
   c)—heating the solution to a temperature between 20-200° C. and keeping the thermostatic solution under stirring for a certain time to obtain an aged solution;

in step (ii)
   d)—depositing the aged solution by a conventional wet deposition technique on the substrate to give a wet film;

and in step (iii)
   e)—curing the aged solution deposited on the substrate at a temperature between room temperature and 200° C., so that the catalytic film is formed on the substrate, comprising the non-stoichiometric and crystalline nickel oxide film in the oxidation states Ni(II) and Ni(III) dispersed in the organic matrix.

The method defined herein allows Ni(II) to be deposited directly on the electrode without prior reaction, which implies greater simplicity and ease of use of any type of deposition method. The purpose of the method is not to generate Ni(0) but instead non-stoichiometric nickel oxide comprising mixtures of Ni(II) and Ni(III), these oxidation states being responsible for the improvements in the catalytic properties of the film with respect to films or films of the prior art with nickel in the oxidation state Ni(0).

Advantageously, the catalytic film of the invention can be obtained wet using numerous deposition techniques on substrates [step ii)-d]. Conventional techniques available to a person having ordinary skill in the art may include spincoating, spraycoating, dipcoating, or Dr. Blade. Likewise, it is compatible with roll-to-roll and inkjet printing, screen-coating and flexography techniques.

In step i)-a) the organic counterion is selected from one of the following: acetate, formate, oxalate, carbonate, octanoate hydroxyacetate, terephthalate, acetylacetonate, hexafluoroacetylacetonate ethylhexanoate, methoxyethoxide, sulfamate.

In step i)-b), preferably the dissolved nickel salt is present at a concentration equal to or greater than 0.05M. Preferably greater than 0.1M.

The non-aqueous solvent of glycol ethers, glycol ether acetates and derivatives thereof has the function of dissolving and stabilizing nickel salts.

Preferably, the non-aqueous solvent is selected from 2-Methoxyethanol, 2-Ethoxyethanol, 2-Butoxyethanol, 2-(2-Ethoxy-ethoxy) ethanol, 2-Propoxyethanol, 2-Isopropoxyethanol, 2-Bezyloxyethanol, 2-(2-Methoxyethoxy) ethanol, 2-(2-Butoxyethoxy)ethanol, and derivatives or mixtures thereof.

The aminoalcohol chelating agent has the function of increasing the solubility and stability of the nickel salt in the solvent. Especially at high concentrations of nickel, its absence in the solution causes the hydrolysis of the nickel salts and their precipitation in the form of a gel.

Preferably, the aminoalcohol chelating agent is selected from mono-ethanolamine (MEA), di-ethanolamine (DEA), tri-ethanolamine (TEA), and derivatives or mixtures thereof.

In step i)-c), preferably the solution is heated to a temperature comprised between 50-100° C., more preferably between 40-80° C.

In this step i)-c), the solution is allowed to age to exhibit a viscosity comprised between 1.5 and 1,000 mPa·s, preferably between 1.5 and 100 mPa·s measured by rotational viscometry at room temperature with a solution volume of 15 mL.

In step iii)-e), curing of the aged solution deposited on the substrate is preferably performed at a temperature of between room temperature and 100° C. During this heating, the solvent is removed. In the invention, ambient temperature is understood to mean a temperature of 22-24° C. at atmospheric pressure.

Preferably, the temperature of the first cure is selected based on the volatility value of the organic compound present in the matrix so that said cure temperature does not completely remove the organic material; in this way, the catalytic film comprises an organic part that is partly responsible for improving the catalytic properties of the catalytic film of the invention. As a general rule, curing is performed at a higher temperature when the organic compounds have a lower volatility, and vice versa.

In an embodiment of the invention the method according to the second aspect of the invention further comprises:
in step (i)-(b)
  adding a previously prepared solution of one or more metal salts and/or metal oxides to the nickel solution; and,
in step (iii)-(e)
  performing a second curing of the aged solution deposited on the substrate, wherein the second curing is carried out at a temperature higher than the temperature of the first curing,
wherein the remaining steps are carried out as defined above in the method for obtaining the catalytic film, so that the catalytic film is formed on the substrate, the film comprising non-stoichiometric and crystalline nickel oxide in the oxidation states $Ni^{2+}$ and $Ni^{3+}$, and metal and/or metal oxide nanoparticles dispersed in the organic matrix.

In this embodiment, the metal salts and/or metal oxides are of metals other than nickel, which may be selected from one or more salts and/or one or more oxides of Fe, Au, Ag, Ru, Ir, Pt, Pd, Re, Os, Rh, Mo, V and mixtures thereof, preferably of Fe, Au, Ag, Pt, Pd, Ru and Ir.

In this embodiment it is necessary to carry out a second curing in order to form the metal nanoparticles and/or the metal oxides in the organic matrix. In one embodiment, the second curing is carried out at a temperature above 100° C., preferably above 200° C. Alternatively, curing with ultraviolet lamp can be performed. With these treatments, metal nanoparticles and metal oxides are generated that bring new properties to the material.

In a third aspect, the present invention relates to the use of the nickel oxide catalytic film according to the first aspect of the invention as an electrode in water electrocatalysis.

Advantageously, the electrode has a overpotential of about 0.29V.

In a different embodiment, the present invention also relates to the use of the nickel oxide catalytic film according to the first aspect of the invention as a photocatalytic electrode.

Advantageously, with the catalytic film of the invention, reactive oxygen species (ROS) such as hydroxyl radicals (·OH) or superoxides ($·O_2^-$) can be generated which possess REDOX properties for breaking down contaminants in water and the atmosphere.

The authors of the present invention have been able to verify that the organic part remains after the curing process, mainly due to the fact that lower temperatures are used, this organic part participating in the formation of pores that allow water to penetrate and thus increase contact with the catalyst and, consequently, improving the catalytic properties of the catalytic film defined in the invention.

In contrast, in the state of the art, curing is usually performed at elevated temperatures in order to remove the organic components so that the catalyst comprises only an inorganic part. Although in very thick films, of the order of microns, when they are heated a lot pores can be generated, in thin films of the order of a few microns or of nanometres, as the gap is generated there is not enough space and it is compacted very quickly. In addition, in the state of the art high temperatures are preferred in order to obtain a better compaction considering that with such compaction the catalytic properties are improved and the stability of the catalyst is increased.

Unexpectedly, the authors of the invention have found that at a lower temperature a film with organic material is obtained in the middle of the pores; these pores allow water to flow between them. Thus, contrary to what might be expected, at lower temperatures, the catalytic film exhibits better catalytic properties while maintaining adequate stability.

BRIEF DESCRIPTION OF THE DRAWINGS

For a better understanding of what has been said, some drawings are attached in which, schematically and only by way of non-limiting example, a practical case of realization is represented.

DETAILED DESCRIPTION OF THE INVENTION

Preferred embodiments for carrying out the present invention are described below.

Example 1

Initially, the NiOx precursor solution was prepared. A 0.9 M solution of nickel acetate tetrahydrate (2.2 g) in methoxyethanol (V=10 mL) was prepared to which 0.04 mL of MEA was added. The mixture was stirred by dissolving a portion of Ni(AcO)$_2$. The mixture was then heated in a thermostatic bath at 30-70° C. for 5-60 min. After 5 min all Ni(AcO)$_2$ was dissolved. The aging step was followed by UV-VIS spectroscopy (see FIG. 1).

Figure 1:
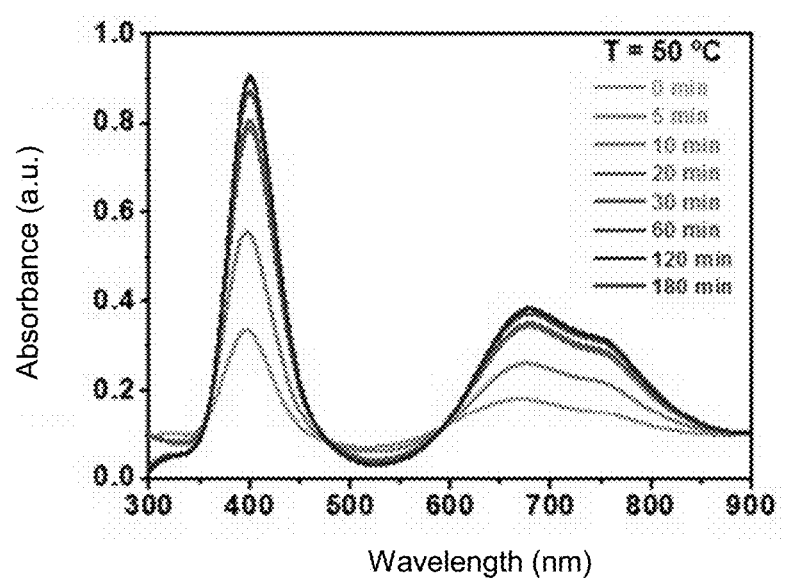
FIG. 1 shows a graph of UV-Visible absorbance of a catalytic film obtained according to Example 1 for a 0.9M Ni(AcO)$_2$ solution in methoxyethanol for different aging times in step i)-c) and constant temperature of 50° C.

FIG. 1 shows a narrow band of absorbance in UV at 397 nm, and another wide band in visible at 670 nm with a shoulder at 754 nm. After 10 minutes of aging, the bands became more intense and shifted slightly towards IR 400, 679 and 755 nm, respectively. As the reaction time increased, the wavelength of the bands were unchanged, but they increased slightly in intensity up to 60 min, a time at which the reaction was considered complete since no change in intensity was observed up to 180 min. After 180 min, it was observed that the solution was no longer crystalline transparent due to the formation of a translucent turquoise gel. This change was attributed to the hydrolysis and polycondensation of nickel complexes resulting in the formation of acetate oxy-hydroxides and nickel methoxyethoxide (Ni(OH)$_2$, NiOOH) with sizes above 100 nm and gelling of the undesirable solution.

Example 2

Figure 2:
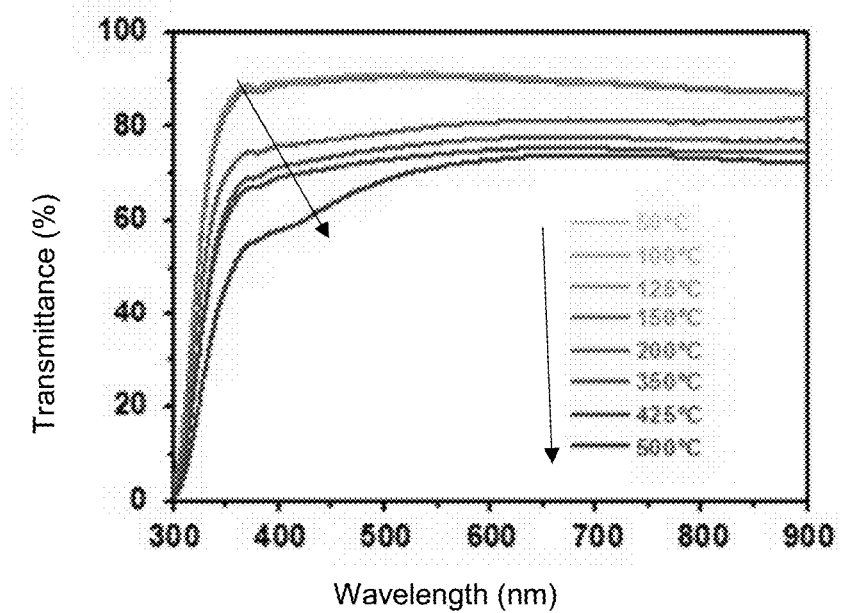
FIG. 2 shows a graph of the UV-Visible transmission spectrum of a catalytic film obtained according to Example 2 for different curing temperatures in step iii)-e).

From the data extracted from the absorbance spectra of Example 1, a Ni(AcO)$_2$ solution of 0.45 M aged for 60 min at 70° C. was employed as NiOx precursor solution. A thin film of NiOx was continued to be deposited on a glass substrate by spincoating at a speed of 2,000 rpm for 20 s. FIG. 2 shows the transmittance curves for different curing temperatures performed over a 20 min time period at that temperature.

The formation of the NiOx layers was followed by UV-Vis spectroscopy (see FIG. 2). The presence of non-stoichiometric NiOx was confirmed by absorption in the visible between 900 and 350 nm. The decrease in transmittance from 350 nm was due to the fact that glass is not transparent to UV. It should be noted that stoichiometric NiO (Ni(II)) is a broadband semiconductor that does not absorb light in the visible spectrum, so the radiation absorption was due to the part of Ni being present in the form of Ni(III) that it does absorb in the visible. As the cure temperature increased from 50° C. to 500° C. (see FIG. 2), the absorption in the visible increased due to the formation of more Ni(III); as the temperature increased, the evaporation of the solvent took place as well as the decomposition of the acetates and the methoxyethoxides and MEA, generating NiOx with greater relative amount of Ni(III). An inflection point was observed at curing temperatures above 200° C., where the transmittance at 550 nm went from 91% at 50° C. to 80% at 200° C. From 200° C. the change was less significant.

Trials

Figure 3:
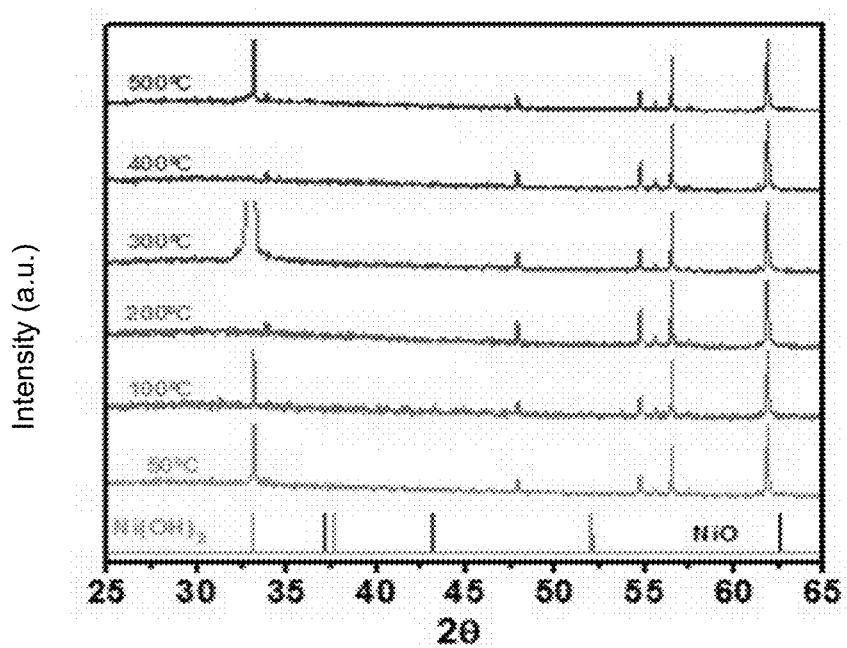
FIG. 3 shows a graph of the X-ray diffraction spectrum of a catalytic film obtained according to Example 2 for different curing temperatures in step iii)-e).

In order to determine the crystallinity of the non-stoichiometric nickel oxide formed in the catalytic film, an X-ray diffraction test was performed for different curing temperatures (see FIG. 3).

It was observed that at the different curing temperatures of 50° C. to 500° C., NiOx showed no diffraction peaks, even at temperatures up to 500° C. All observed peaks belonged to silicon, which is the substrate used to take the measurements. The absence of characteristic NiO, NiOOH, or Ni(OH)$_2$ peaks confirmed that NiOx films were formed by nanometric crystalline domains, i.e., very small-sized nanocrystals.

Figure 4:
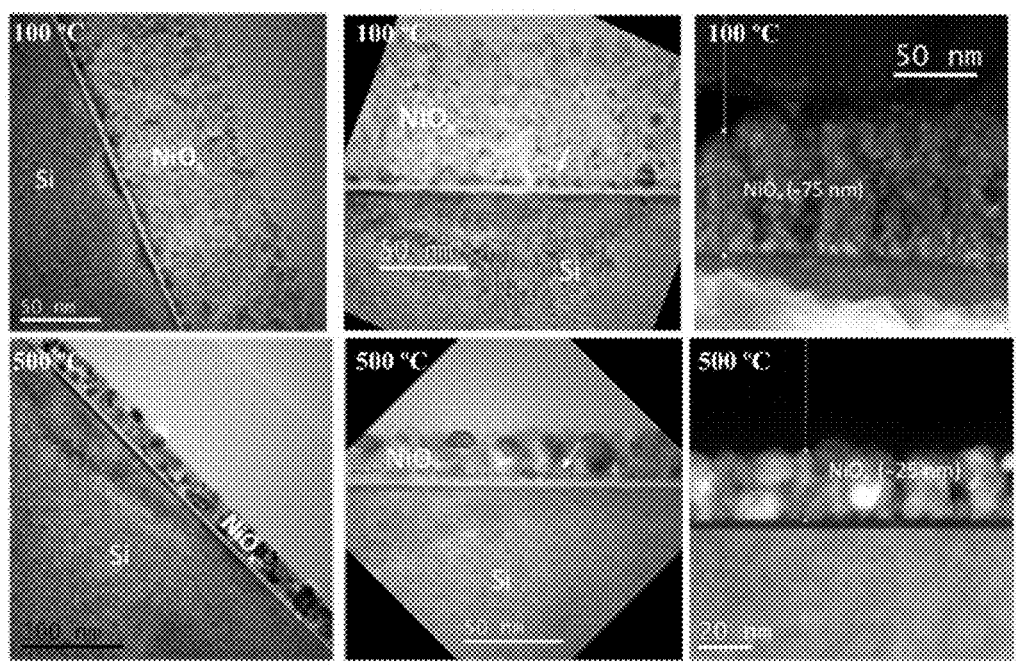
FIG. 4 shows transmission electron microscope (TEM) images of a catalytic film obtained according to Example 2 and cured, in step iii)-e), at a temperature of 100° C. compared to a cure at a temperature of 500° C.

To determine the presence of an organic part after the curing step, images were taken with a transmission electron microscope (TEM) (see FIG. 4). In FIG. 4 the differences obtained between a cured film, for example, at 100° C. with respect to another cured film at 500° C., from a solution with the same composition are shown. With the 500° C. film a very compact material was obtained with about 25 nanometers of thickness. Surprisingly, the film with a cure at 100° C. was obtained with a thickness of 100 nanometers with separation between the grains. Contrary to what might be expected, at lower temperatures the material showed better catalytic properties and adequate stability.

Figure 5:
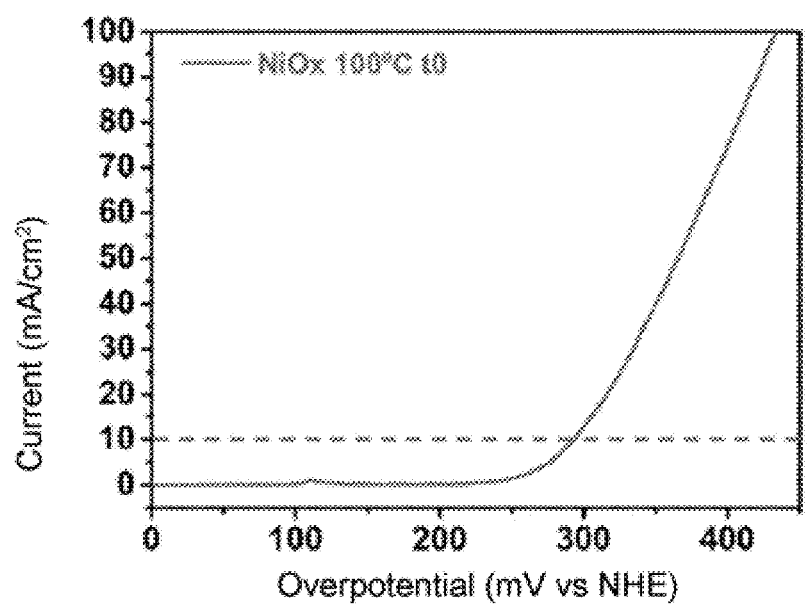
FIG. 5 shows a graph of the water hydrolysis employing the catalytic film obtained according to Example 2 of the invention with cure temperature of 100° C.
Figure 6:
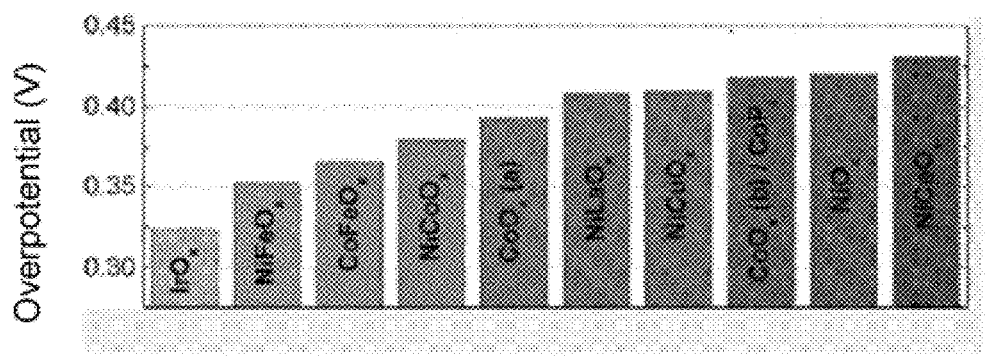
FIG. 6 shows a bar diagram of the overpotential (V) of prior art oxides in 1M NaOH at 10 mA cm$^{-2}$ described by McCrory et al in "*Benchmarking Heterogeneous Electrocatalysts for the Oxygen Evolution Reaction*" in J. Am. Chem. Soc. 2013, 135, 16977-16987.

A test of the catalytic properties of the catalytic film obtained was then performed. The most representative measure of catalytic activity was the overpotential needed to reach current densities of 10 mA/cm$^2$. The overpotential is defined as the excess energy that has to be applied for the reaction to occur, that is, the activation energy. In general, all chemical reactions have an activation energy. Catalysts reduce said activation energy. In electrochemical terms, the activation energy can in some way be equated to the overpotential. Therefore, we proceeded to check the overpotential necessary to perform the electrolysis of water using an electrode formed by a sheet of nickel with the catalytic film. The overpotentials obtained were of the order of 0.29 V (290 mV) (see FIG. 5) which demonstrated improvement of the overpotentials measured with reference materials such as Ir and Ru oxides (see FIG. 6), where specifically the IrOx (non-stoichiometric iridium oxide) shows a overpotential of 0.33 V. Finally, the small peak around 100 mV (FIG. 5) evidenced the formation of Ni(III) oxide and, therefore, the passage of a part of Ni(II) from the Ni(II) state to Ni(III).

The invention claimed is:

1. A nickel oxide catalytic film, wherein the catalytic film is provided with:
   an inorganic part, and
   an organic part,
wherein the inorganic part comprises a non-stoichiometric nickel oxide in oxidation states of Ni (II) and Ni (III), wherein the non-stoichiometric nickel oxide is crystalline, and
wherein the organic part is present between 10% and 30% wt. of the total weight of the film and the non-stoichiometric nickel oxide is dispersed therein, so that the organic part is a support for the inorganic part, and wherein the organic part is composed of at least one organic compound selected from the group of an alkoxide, acetate, and amine, and
wherein the catalytic film is supported on a substrate.

2. The catalytic film according to claim 1, wherein the catalytic film has a thickness of between 20 and 600 nm.

3. The catalytic film according to claim 1, wherein the catalytic film is one layer.

4. The catalytic film according to claim 1, wherein the catalytic film supported on a substrate is an electrode.

5. The catalytic film of claim 1, wherein the catalytic film is a photocatalytic electrode.

* * * * *